(12) United States Patent
Peuziat et al.

(10) Patent No.: US 8,073,120 B2
(45) Date of Patent: Dec. 6, 2011

(54) RELATING TO TELEPHONE COMMUNICATIONS

(75) Inventors: Xavier Peuziat, Satolas et Bonce (FR); Philippe Wieczorek, Saint Ismier (FR); Marc Brandt, Eybens (FR); Galina Guyot, Crolles (FR); Senthil-Kumar Ananda Ganesan, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1004 days.

(21) Appl. No.: 11/632,806

(22) PCT Filed: Jul. 1, 2005

(86) PCT No.: PCT/EP2005/053145
§ 371 (c)(1),
(2), (4) Date: Aug. 24, 2007

(87) PCT Pub. No.: WO2006/008229
PCT Pub. Date: Jan. 26, 2006

(65) Prior Publication Data
US 2008/0107250 A1    May 8, 2008

(30) Foreign Application Priority Data
Jul. 23, 2004    (EP) .................................. 04300469

(51) Int. Cl.
*H04M 1/56* (2006.01)
*H04M 15/06* (2006.01)
*H04M 3/42* (2006.01)

(52) U.S. Cl. ............... 379/142.01; 379/201.07; 379/257

(58) Field of Classification Search ............. 379/142.01, 379/201.06, 201.1, 257, 76, 80; 455/414.1, 455/414.3, 414.4, 456.1
See application file for complete search history.

(56) References Cited

U.S. PATENT DOCUMENTS

| | | | |
|---|---|---|---|
| 6,842,512 B2 * | 1/2005 | Pedersen .................. | 379/142.01 |
| 7,394,345 B1 * | 7/2008 | Ehlinger et al. .............. | 340/5.21 |
| 7,813,490 B2 * | 10/2010 | DeMent et al. .......... | 379/221.03 |
| 2002/0090926 A1 | 7/2002 | Pirkola et al. | |
| 2003/0194080 A1 * | 10/2003 | Michaelis et al. ............. | 379/257 |

FOREIGN PATENT DOCUMENTS

| | | |
|---|---|---|
| DE | 102 45 642 A1 | 4/2004 |
| DE | 10245642 A1 | 4/2004 |
| EP | 1 198 113 A1 | 4/2002 |
| EP | 1 313 330 A | 5/2003 |
| EP | 1313330 A1 | 5/2003 |
| EP | 1 432 218 A1 | 6/2004 |
| FR | 2 837 049 | 9/2003 |
| FR | 2837049 A1 | 9/2003 |
| WO | 9944374 A1 | 9/1999 |
| WO | WO 99/44374 | 9/1999 |
| WO | WO 03/096709 A2 | 11/2003 |

* cited by examiner

*Primary Examiner* — Quoc D Tran

(57) ABSTRACT

According to one aspect of the present invention, there is provided a method, in a telecommunication system, of establishing a connection between a calling terminal and a called terminal, the called terminal having an associated presence status, the connection establishment being initiated by a connection establishment request sent by the calling terminal, comprising: obtaining, in response to the connection establishment request, the presence status associated with the called terminal; and supplying the obtained presence status to the calling terminal.

16 Claims, 1 Drawing Sheet

RELATING TO TELEPHONE COMMUNICATIONS

The present application claims priority under 35 U.S.C. §371 to PCT Application PCT/EP2005/053145, filed on Jul. 1, 2005, and entitled "Presentation to Caller of Presence Information About Called Party" which is hereby incorporated by reference in their entirety.

FIELD OF THE DISCLOSURE

The present invention relates to the field of telecommunications, and particularly to the accessing of presence-type information using telephone communications.

SUMMARY

In recent years the use of presence information has become increasingly widespread in the field of telecommunications. Presence information is now widely used, for example, by instant messaging applications, use of which is being increasingly made by many private and enterprise computer users. Instant messaging applications enable a user to publish presence information, such as a presence status, to view the presence information of other users, and enable instant messages to be sent to other users. The term 'publishing' is commonly used in the field of presence in relation to the making available of presence information to other users to enable them to view or access that status. Some presence systems use a central storage repository, often referred to as a presence server, to which presence information may be published to or retrieved from. Other systems store presence information locally and, through a local presence server, make this information available directly to other users, for example using a point-to-point connection. For the purpose of the following description the term presence server is used generally as relating to an element containing presence information and for making that presence information available to one or more other users.

Instant messaging applications are also finding their way onto advanced mobile telephones and personal digital assistants, bringing the advantages of instant messaging to mobile users.

Advanced telecommunication system, such as session initiation protocol (SIP) networks inherently provide support for presence. Indeed, many instant messaging applications use the presence framework provided by SIP. SIP enables users of SIP phones to access advanced telephony functionality based on presence information. Such functionality includes, for example, advanced rules-based call routing and forwarding based on the published presence status of a user. For example, a SIP phone user having their presence status published as 'at work' may cause all telephone calls made to the user's SIP phone to be automatically forwarded to the user's work phone.

Presence is also widely used in advanced telecommunications systems such as push-to-talk, a type of Voice over IP (VOIP) system available on some mobile telephones. Push-to-talk systems use presence to enable a user to see which members of their contact or 'buddy' list are presently contactable, and enables quasi-instantaneous voice messages to be sent to available contacts.

However, in order for a user communication terminal, such as a telephone, to be able to make use of presence systems, the user communication terminal has to be presence capable. Since presence systems are controlled and managed by a user-side presence application on the user communication terminal, the user communication terminal has to have sufficient processing power and capabilities for executing such an application. Thus, presence systems are only available on modern microprocessor-based user communication terminals such as so-called smart-phones, advanced mobile telephones, personal digital assistants, personal computers, and the like.

Currently, however, there are vast numbers of legacy user communication terminals, such as conventional so-called 'black phones' and older mobile telephones which do not have any, or at least not sufficient, processing capabilities, and thus are unable to access presence information. Thus, if a user of a conventional telephone wishes to check the presence status of a user they wish to call prior to calling them, they currently have to use a separate terminal, such as a personal computer running a suitable presence application to determine whether that user is available, and then to place a call using the conventional telephone. This situation is somewhat inconvenient for the user of a conventional telephone who may not always have access to a separate presence capable terminal.

Accordingly, one aim of the present invention is to overcome, or at least alleviate, at least some of the above-mentioned problems.

According to a first aspect of the present invention, there is provided a method, in a telecommunication system, of establishing a connection between a calling terminal and a called terminal, the called terminal having an associated presence status, the connection establishment being initiated by a connection establishment request sent by the calling terminal. The method comprises obtaining, in response to the connection establishment request, the presence status associated with the called terminal, and supplying the obtained presence status to the calling terminal.

Advantageously such a system enables users of non-presence capable communication terminals to access presence information previously only available to presence capable communication terminals.

Suitably the telecommunications system includes at least one network switching element for use in establishing the connection and wherein the presence status associated with the called terminal is obtainable from a presence server, the method further comprising one of the at least one network switching elements obtaining the presence status from the presence server.

Suitably the obtained presence status is converted to an audio format and is supplied to the calling terminal by way of a ringing back tone.

Alternatively, the obtained presence status may be encoding supplied with a ringing back tone to enable display of the encoded status on a suitable display unit of the calling terminal.

Suitably, the network switching element pages the called terminal only once the obtained status has been supplied to the calling terminal.

According to a second aspect of the present invention, there is provided apparatus for establishing a connection between a calling terminal and a called terminal having an associated presence status, the connection establishment being initiated by a connection establishment request sent by the calling terminal. The apparatus comprises processing logic for obtaining, in response to the connection establishment request, the presence status associated with the called terminal, and an output element for supplying the obtained presence status to the calling terminal.

Suitably, the apparatus further comprises a presence server in which the presence status of the called terminal is held.

Suitably, the processing logic is adapted for obtaining the presence status from the presence server.

Suitably, the apparatus further comprises a converter for converting the obtained presence status into a format suitable for output on the calling terminal.

The converter may be adapted for converting the obtained presence status to an audio format and for supplying the converted presence status to the calling terminal by way of a ringing back tone.

Alternatively, the converter may be adapted for converting the obtained presence status into a textual format and for supplying the encoded presence status along with a ringing back tone to enable display of the encoded status on a suitable display unit of the calling terminal.

The apparatus may be further adapted for supplying the obtained presence status to the calling terminal prior to paging the called terminal.

According to a third aspect of the present invention, there is provided a telecommunications network comprising apparatus as mentioned above.

According to a fourth aspect of the present invention, there is provided a method of operating a network switching element of a telecommunication network as described above.

According to fifth aspect of the present invention, there is provided a network switching element adapted for operating in accordance with any of the above-described method steps.

An embodiment of the invention will now be described, by way of example only, in which:

DETAILED DESCRIPTION

Figure 1:
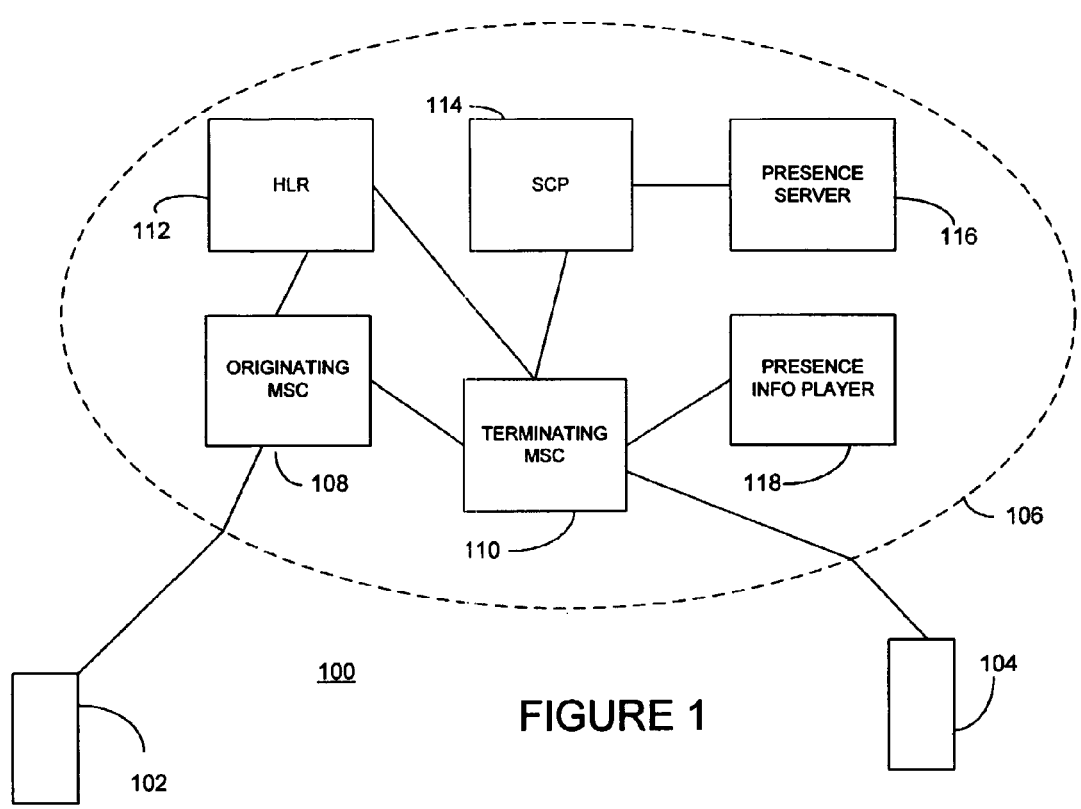
FIG. 1 is a block diagram showing a telecommunications system 100 according to an embodiment of the present invention.

Referring now to FIG. 1, there is shown a telecommunications system 100 comprising a telecommunications network 106 comprising various network elements 108, 110, 112, 114, 116 and 118. A calling terminal or device 102 places a call or communication establishment request to the called terminal or device 104 via the telecommunications network 106 with a view to establishing a communication, such as a call, between the two terminals in the normal manner. Typically, a call establishment request is made by the user of the calling terminal 102 dialing the telephone subscriber number of the called party 104. Those skilled in the art will appreciate that the placing of a call generally involves the sending of one or more messages or control signals, at least one of which is, or has as its effect, a call establishment request, between the calling party, and the network and/or the called party 104, with the exact mechanism dependent largely on the type of network.

In the present embodiment the calling terminal 102 is a mobile telephone and the network 106 is a mobile telephony network. It will be appreciated, though, that other configurations could be used. For example, the calling terminal 102 could be a conventional 'black phone' for use on the plain old telephone system (POTS) and a POTS type network (not shown) could be used to connect the calling terminal 102 to the mobile network 106. The calling terminal 102 is non-presence capable terminal—in other words it does not posses any presence capable applications or functionality. If the calling terminal 102 were to be a presence capable terminal, it is assumed, for the purposes of this example, that such functionality is disabled.

The called terminal 104, on the other hand, is a presence capable terminal, such as a so-called smart phone, personal digital assistant, or other suitable communication terminal. By presence-capable is meant that the terminal 104 runs a suitable presence application capable of publishing presence information associated with the terminal 104 to a presence server, such as the presence server 116. As previously mentioned, the presence information published by the terminal 104 may relate to the presence status of a user of the terminal, or may result to the presence status of the terminal itself.

The calling terminal 104 determines a presence status of either the terminal itself or of a user of the terminal through use of a suitable presence software application running on the terminal. The presence status may be determined in a number of ways. For example, the presence status may be periodically entered or changed by the user of the terminal, or the terminal itself may automatically modify the presence status based on, for example, usage made of the terminal.

Presence statuses may be predefined by the terminal or may be user configurable. Example presence statuses may be "uavailable", "busy", "not connected", "in a meeting", "driving until 16h00", and the like. The determined presence status is published to a presence server 116 so that the presence status of the terminal 104 is available to other user presence-capable terminals. The presence status may be published to the presence server 116 in the normal manner. For instance, if the called terminal 104 is a SIP phone the presence status may be published by sending a SIP REGISTER message to the presence server 116. If the called terminal 104 is a so-called smart phone having an Internet Protocol (IP) connection, the current presence status of the called terminal 104 may be sent to the presence server 116 by way of a suitable presence application, such as an instant messaging application. Such an instant messaging application may use SIP or any other suitable protocol.

The call establishment request made by the calling terminal 102 is received by the originating mobile switching centre (MSC) 108 to which the calling terminal 102 is currently connected. The MSC 108 queries the home location register (HLR) 112 to determine the location of the called terminal 104 and routes the call establishment request, based on information obtained from the HLR, to the MSC to which the called terminal 104 is currently connected, in this case the terminating MSC 110. Upon receiving the call establishment request the terminating MSC 110 queries the HLR 112 to determine whether the called terminal 104 has subscribed to any value added data service requiring use of the SCP 114. This information may be provided by way of a flag associated with the called terminal's subscriber number stored in the HLR 112.

If, based on the flag, the MSC 110 determines that use of the SCP 114 is required the MSC 110 queries the SCP 114 to determine whether the called terminal 104 is subscribed to a service hereinafter referred to as the presence announcement (PA) service.

If the called terminal 104 has subscribed to the PA service the service control platform (SCP) 114 obtains the current presence status of the called terminal 104. In the present embodiment this is obtained from the presence server 116. The presence information of the called terminal 104 may be obtained by requesting the current presence status of the subscriber number of the called terminal 104 from the presence server 116. The request may be made through a suitable presence application or processing logic.

The MSC 110, under the control of the SCP 114, connects to a presence information player 118 which takes the retrieved presence information, supplied by the SCP 114 through the MSC 110, and provides a suitable audio output representing the presence information. For example, the presence information player 118 may use a text-to-speech (TTS) engine (not shown) to convert a textually retrieved presence status into a spoken message. The audio output of the presence information player 118 is output to the calling terminal 102 by way of a ringing back tone. In other words, the MSC 110 replaces the usual ringing tone heard by the user of the calling terminal 102 with the audio output from the presence info player. The audio output may suitably be mixed over the top of the conventional ringing tone.

At this point, the MSC 110 has not yet paged the called terminal 104 and hence the called terminal 104 has not started ringing. Preferably, the MSC 110 only pages the called terminal 104 once the output audio message has been played at least once, preferably in its entirety, the reasons for which are explained below.

Since the called terminal 104 is running a suitable presence application (not shown), it is possible that the presence application may also affect the way in which the called terminal 104 responds to calls. For example, the presence application running on the called terminal 104 may cause all calls made to the terminal whilst the presence status is 'busy' to be automatically forwarded to a voice-mail service. If the MSC 110 thus pages the called terminal 104 upon receiving the call establishment request the call would be automatically established with the voice mail service, without the calling party being able to hear the audio output provided by the presence information player 118. By delaying the paging of the called terminal 104 until after the message has been played enables the user of the calling terminal 102 to hear the message and to decide whether or not continue the call establishment or to hang up. Alternatively, the presence application on the called terminal could alternatively prevent the called terminal 104 from ringing, for example by entering a silent profile, depending on the presence status of the terminal.

It is important to note that the present embodiment enables the user of the calling terminal 102 to obtain the presence information of the called terminal 104 without incurring a call charge. This is because the presence information is provided to the user of the calling terminal 102 prior to the called terminal 104 being paged. Even once the called terminal 104 is paged there is still no call established unless the called terminal 104 accepts the call or forwards the call to a voice mail service.

If, for example, the user of the calling terminal 102 hears the presence information of the called terminal 104 as being 'in a meeting' the user of the calling terminal 102 has the choice of hanging-up calling terminal 104, or waiting until the end of the audio message, at which time the called terminal 104 will be paged. As previously mentioned, whether the actual paging of the called terminal 104 will cause the called terminal 104 to ring will depend on the configuration of the presence application controlling the presence thereon.

In an alternative embodiment, the presence status of the called terminal 104 is stored locally thereon, and is not published to the presence server 116. The called terminal 104, through use of a local presence server, makes the presence status of the called terminal 104 available directly to other users having appropriate authorization. In local presence systems, authorization is achieved by a 'request and active accept' mechanism. This may be achieved by having a suitable network-based presence application running on or accessible from, for example, the SCP 114. The network-based presence application (not shown) may request that the called terminal 104 makes its presence information available to the network-based presence application. The called terminal 104 actively accepts the request, and thereafter the network-based presence application may obtain, for example via a point-to-point connection with the called terminal 104, the presence status of the called terminal 104 on demand. If, for example, the called terminal 104 has an IP address, the network-based presence application may obtain the presence information of the called terminal by way of a point-to-point connection using TCP/IP. The SCP may be used to store, for example, the IP or other address of the called terminal 104 through which the presence status may be obtained.

The MSC 110, upon receiving the connection establishment request may request the presence status of the called terminal 104 directly from the local presence server of the called terminal 104. Alternatively, the MSC or other network element may periodically request the presence information of the called terminal 104 and may store the obtained information in a local store for later use.

In a further embodiment, the called terminal 104 may not itself be presence-capable. For example, the called terminal 104 may be a conventional 'black phone' and the presence status of the terminal 104 may be published to the presence server 116 on behalf of the called terminal 104 through a separate presence-capable terminal such as a personal computer or personal digital assistant. This allows the terminal 104 to define a presence status for use by other terminals without requiring the terminal itself to be presence-capable.

In yet further embodiments, instead of the MSC 110 connecting to the presence information player 118 to create an audio output of the presence status, the presence information obtained from the presence server 116 is converted to a suitable textual format and is presented to the calling terminal 102 by way of a visual display on the calling terminal. Many conventional telephones have a small display which enables the caller line identity of a caller to be displayed thereon. In the same way that the caller line ID is encoded between ringing tones, the presence status of the caller party 104 is encoded in the same way and is sent with the ringing tone by the MSC 110.

In a yet further embodiment, instead of the MSC 110 connecting to the presence information player 118 a connection is made with an interactive voice application (not shown). Using an interactive voice application enables increased functionality to be easily added to accommodate, for example, rules based functionality associated with the presence status of the called party 104. The voice application can obtain the presence status of the called terminal 104 as described above and may additionally provide a series of voice menus enabling a calling party to select numerous options such as requesting callback or SMS notification when a called party's presence becomes 'available', having an SMS message sent to the called party to indicate that a call establishment request was made, and so on.

Although reference has only been made to a single presence server 116 it is possible that different called terminals may make their presence status available to different remotely accessible presence servers. In this case, the SCP preferably contains a record for each called terminal detailing the address at which the presence status for each called terminal may be obtained. Such presence servers may be provided within the telecommunications network 106 or via an externally accessible network or network of networks (not shown) such as the Internet.

Since the presence information of the called party 104 is provided free of charge to the calling party 102, it may be preferable for the called party 104 to pay a subscription to the provider of the network 106 so that the presence information of the called party 104 is available to callers. If such a subscription is taken by the called party 104 the network provider stores a flag in the HLR 112 indicating this, and may store additional data in the SCP 114 providing further details of the service subscribed to.

It should be noted that the presence status associated with a terminal is independent from and potentially different from the network-based availability of that terminal. For example, the presence status of a terminal may be 'available' indicating that the user of the terminal is generally available even though the terminal itself may be already connected in a call and therefore appears as 'busy' from the network point of view.

Although the above embodiments have been described with reference primarily to mobile communication terminals and mobile telecommunications networks, it will be appreciated that the inventive concepts described herein are in no way limited thereto. For example, the above embodiments may be suitably modified to enable the presence information of a fixed line called party to provide their presence status to a calling party. In this case the mobile switching centers 108 and 110 may be replaced, for example, by intelligent switches of a non-mobile network.

Those skilled in the art will appreciate that the term 'call' used herein, whilst generally referring to telephony-type calls may also refer to other communication establishment requests and/or communication establishments.

The invention claimed is:

1. A method, in a telecommunication system, of establishing a connection between a calling terminal and a called terminal, the called terminal having an associated presence status, the connection establishment being initiated by a connection establishment request sent by the calling terminal, comprising:
   receiving the connection establishment request by at least one network element that determines whether the called terminal has subscribed to a presence announcement service;
   obtaining, in response to the connection establishment request and a determination the called terminal has subscribed to the presence announcement service, the presence status associated with the called terminal; and
   supplying the obtained presence status in an audio format to the calling terminal by way of a ringing back tone.

2. A method according to claim 1, wherein the telecommunications system includes the at least one network element for use in establishing the connection and wherein the presence status associated with the called terminal is obtainable from a presence server, the method further comprising one of the at least one network elements obtaining the presence status from the presence server.

3. The method of claim 1, further comprising converting the obtained presence status to the audio format and wherein the step of supplying the obtained presence status further comprises one of the at least one network elements supplying the converted status by way of the ringing back tone.

4. The method of claim 1, further comprising encoding the obtained presence status to enable display of the encoded status on a suitable display unit of the calling terminal.

5. The method of claim 1, further comprising paging the called terminal only once the obtained status has been supplied to the calling terminal.

6. Apparatus for establishing a connection between a calling terminal and a called terminal having an associated presence status, the connection establishment being initiated by a connection establishment request sent by the calling terminal, comprising:
   processing logic for obtaining, in response to the connection establishment request, the presence status associated with the called terminal;
   at least one network element that determines whether the called terminal has subscribed to a presence announcement service; and
   an output element for supplying the obtained presence status in an audio format to the calling terminal by way of a ringing back tone if the called terminal has subscribed to the presence announcement service.

7. The apparatus of claim 6, further comprising a presence server from which the presence status associated with the called terminal is obtainable.

8. The apparatus of claim 7, the processing logic being adapted for obtaining the presence status from the presence server.

9. The apparatus of claim 7, wherein the presence server is a network-based presence server.

10. The apparatus of claim 7, wherein the presence server is a terminal-based presence server.

11. The apparatus of claim 6, further comprising a converter for converting the obtained presence status into the audio format suitable for output on the calling terminal.

12. The apparatus of claim 11, the converter adapted for converting the obtained presence status into a textual format and for supplying the encoded presence status along with the ringing back tone to enable display of the encoded status on a suitable display unit of the calling terminal.

13. The apparatus of claim 6, adapted for supplying the obtained presence status to the calling terminal prior to paging the called terminal.

14. A telecommunications network comprising apparatus as claimed in claim 6.

15. A method of operating a network element of a telecommunication network according to claim 1.

16. A network element adapted for operating in accordance with the method of claim 1.

* * * * *